United States Patent Office 3,271,361
Patented Sept. 6, 1966

3,271,361
PROCESS FOR MAKING ORDERED SILOXAZANE POLYMERS
James G. Murray, Scotia, N.Y., assignor to General Electric Company, a corporation of New York
No Drawing. Filed Jan. 13, 1965, Ser. No. 425,346
3 Claims. (Cl. 260—46.5)

This invention is concerned with making regular or ordered siloxazane polymers. More particularly the invention is concerned with a process for making ordered siloxazane polymers which comprises treating a cyclic siloxazane of the formula (I)
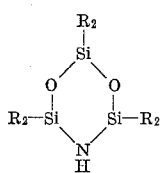

with iodine with the resultant formation of a linear polymer retaining essentially completely the sequential structure (II)
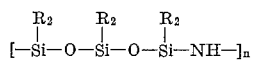

where R is a monovalent hydrocarbon radical, with the proviso that where one R on a silicon atom is a member of the class consisting of aryl and alkaryl radicals, the other R is selected from the same class, and $n$ is a whole number in excess of 10, for example, up to 100,000 or more and advantageously within the range of from about 50 to 25,000.

The usual polymerization of cyclic polymers of Formula I with basic catalysts such as potassium hydroxide, tetramethylammonium hydroxide, etc., to form linear high molecular weight polymers, in addition to having present in the linear polymer a certain amount of the sequential units present in the monomer, also have in the polymer a substantial amount of other sequences derived by a more or less random opening or breaking of the various siloxane and siloxazane bonds in the cyclic monomer. Thus, in the polymerization of the cyclic siloxazane of the formula (III)
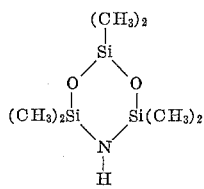

with tetramethylammonium hydroxide, there are present in the polymer substantial amounts (from about 20 to 40 percent of the total units) of sequential units of the formula (IV)
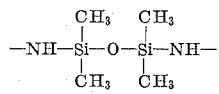

and (V)
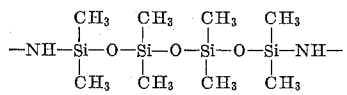

There are also present smaller amounts of sequences having five, six and seven siloxy units between silazane units indicative of further equilibration reactions in the polymer.

I have now found that the polymerization of siloxazanes of the Formula I, using iodine as a polymerization catalyst, results in the essentially complete retention of the sequential structure that was present in the original monomer. The presence of any other sequence of siloxy units and siloxazane units is essentially insignificant and in many instances nonexistent. It has been found that by this regularity of the recurring monomer unit, one obtains polymers having properties different from those polymers which are composed of units of random distribution as far as the sequences of monomer units are concerned. These differences in properties often are evidenced by increased crystallinity, increases in tensile strength and in tear strength, increased resistance to solvents, etc., of organic polysiloxazane rubbers prepared from curing these linear polymers with the usual curing agent, such as benzoyl peroxide, at temperatures of from about 125° to 250° C., for times ranging from about 15 minutes to 24 hours. These organic polysiloxazane rubbers which may, if desired, contain various fillers, such as carbon black, finely divided silicas, etc., find application as heat-resistant compositions useful in the insulating and protective arts.

Among the monovalent hydrocarbon radicals which R may be are, for instance, alkyl radicals (e.g., methyl, ethyl, propyl, isopropyl, butyl, octyl, etc.); aryl radicals (e.g., phenyl, naphthyl, biphenyl, etc.); aralkyl radicals (e.g., benzyl, phenylethyl, etc.); alkaryl radicals (e.g., tolyl, xylyl, ethylphenyl, etc.); etc. The presence of inert substituents on the monovalent hydrocarbon radicals is not precluded.

The reaction of the cyclic siloxazane with the iodine can advantageously be carried out merely by mixing the two materials together, especially where the siloxazane is a liquid. However, where the siloxazane is a solid, or even in those cases where the siloxazane is a liquid, it may be desirable to dissolve the latter in a solvent such as diethyl ether, dibutyl ether, tetrahydrofuran, benzene, etc., with the iodine catalyst, preferably at room temperature, and then heat the mixture up to the reflux temperature of the mass or higher (if pressure should be used) and advantageously within a temperature range of from about 35° to 125° C., or higher.

The amount of iodine used can be varied widely but preferably is within the range of about 0.001 to 2%, by weight, based on the weight of the siloxazane.

In order that those skilled in the art may better understand how the present invention can be practiced, the following examples are given by way of illustration and not by way of limitation. All parts are by weight. All intrinsic viscosities recited were measured in benzene at 25° C. The iodine solution was a 1% solids solution in dry benzene.

The determination as to whether there was a retention of the monomer unit was carried out by means of a methanolysis reaction and an analysis of the methoxysiloxanes. The exact procedure comprised drying methanol carefully and saturating the methanol with ammonium chloride by refluxing it with an excess of a dry reagent grade salt, allowing it to cool to room temperature protected from moisture. The supernatant liquid was decanted in a nitrogen dry box and stored in a capped bottle in a desiccator. The standard methanolysis procedure was to reflux 0.6 gram of the polymer resulting from the reaction of the cyclic siloxazane and the iodine with 2.0 ml. of the methanol-ammonium chloride solution for 2 hours. The resulting low molecular weight methoxysiloxanes were analyzed by vapor phase chromatography, and from the relative amounts of each methoxysiloxane, an analysis of the polymer structure was derived. The above described methanolysis reaction was found to cleave silazane bonds without siloxane bond cleavage.

Example 1

In this example 12 grams of the cyclic siloxazane of the formula (VI) 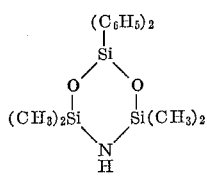

was treated with 0.25 ml. of a 1% solution of iodine in benzene, by heating the mixture at 105° C. for 5 hours. The viscous gum thus obtained had an intrinsic viscosity $[\eta]=1.25$. The determination of the monomer unit retention by the above described methanolysis process revealed that essentially the entire polymer (at least 99 percent) was composed of recurring units of the formula (VII) 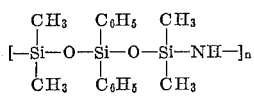

where $n$ is a whole number in excess of 50.

When, however, the same cyclic siloxazane was treated with a basic catalyst, such as tetramethylammonium hydroxide, under similar conditions, the polymer obtained had an intrinsic viscosity $[\eta]=0.69$, which when analyzed for monomer unit retention showed that there were a number of units in the polymer composed of segments conforming to units of Formulas IV and V indicating random rather than regular cleavage of the unit comprising the starting cyclic siloxazane.

Example 2

In this example, 12 grams of the cyclic siloxazane of Formula III was polymerized using 0.25 ml. of the 1% solution of iodine in benzene by allowing the mixture to stand in a sealed vessel at room temperature (about 25° C.) for 16 hours and then heating the vessel to 70–80° C. for 5 hours. The linear polymeric product obtained had an intrinsic viscosity $[\eta]=0.26$. Upon analysis the above described methanolysis reaction showed the polymer consisted essentially of recurring monomer units of the formula (VIII) 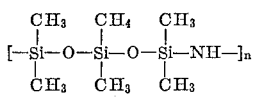

where $n$ is a whole number in excess of 50.

When the reaction was carried out at 25° C. for 72 hours, a higher intrinsic viscosity gum ($[\eta]=0.48$) was obtained.

When the cyclic siloxazane of this example was treated with tetramethylammonium hydroxide at 25° C. for 3 days in the same manner as above, and the polymer thus obtained was analyzed as above, it was found that the polymer contained a number of fragments which apparently had broken off from the monomer unit. This was in contrast to the high concentration of regular recurring units of Formula VIII in the polymer of Example 2.

Example 3

This example shows that when there is only one aryl group on a silicon in addition to another non-aryl hydrocarbon radical, cleavage of the aryl group from the silicon atom occurs and there is little if any polymerization. More particularly, the cyclic siloxazane of the formula (IX) 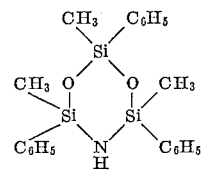

was heated with iodine similarly as was done in Example 1. After this procedure, it was found that phenyl groups had been cleaved from the silicon atom, and additionally there was no evidence of polymerization, but rather indications existed that there was almost complete retention of the cyclic form of the monomer unit.

It will of course be apparent to those skilled in the art that other cyclic siloxazanes coming within the scope of Formula I can be employed for treatment with the iodine to form other ordered siloxazane polymers. Additionally, other conditions of reaction within the general description recited hereinbefore may also be employed within the scope of my invention.

What I claim as new and desire to secure by Letters Patent of the United States is:

1. The process which comprises effecting reaction between a cyclic siloxazane with the formula

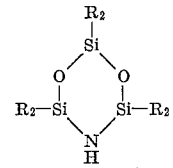

with iodine, thereby, to obtain a polymer consisting essentially of recurring units of the formula

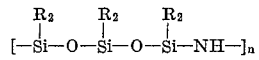

where R is a monovalent hydrocarbon selected from the class consisting of alkyl, aryl, aralkyl, and alkaryl radicals, with the proviso that where one R on a silicon is a member selected from the class consisting of aryl and alkaryl radicals, the other R is bonded to the same silicon atom and is selected from the same class of aryl and alkaryl radicals, and $n$ is a whole number in excess of 50.

2. The process which comprises effecting reaction between a cyclic siloxazane of the formula

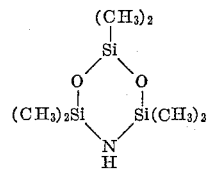

and iodine to obtain a polymer consisting essentially of recurring units of the formula

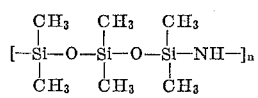

where $n$ is a whole number in excess of 50.

3. The process which comprises effecting reaction between a cyclic siloxazane of the formula

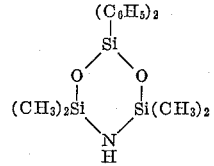

with iodine thereby to obtain a polymer consisting essentially of recurring units of the formula
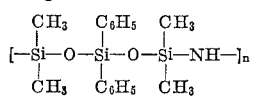
where $n$ is a whole number in excess of 50.
References Cited by the Examiner
UNITED STATES PATENTS
| | | | |
|---|---|---|---|
| 2,435,148 | 1/1948 | McGregor et al. | 260—448.2 |
| 2,994,684 | 8/1961 | Johannson | 260—448.2 |
| 3,002,951 | 10/1961 | Johannson | 260—448.2 |
| 3,033,807 | 5/1962 | Krueckel | 260—46 |
| 3,222,320 | 12/1965 | Wolf | 260—448.2 |
| 3,239,550 | 3/1966 | Murray | 260—448.2 |
LEON J. BERCOVITZ, *Primary Examiner.*
M. I. MARQUIS, *Assistant Examiner.*